May 2, 1967     K. E. JOHNSON     3,317,769
CATHODE-RAY TUBE HAVING A QUADRIPOLE
ELECTROSTATIC FOCUSING LENS

Filed Oct. 14, 1963     2 Sheets-Sheet 1

INVENTOR.
KEITH ERIC JOHNSON
BY
AGENT

United States Patent Office 3,317,769
Patented May 2, 1967

3,317,769
CATHODE-RAY TUBE HAVING A QUADRIPOLE
ELECTROSTATIC FOCUSING LENS
Keith Eric Johnson, Smallfield, near Horley, Surrey, England, assignor to North American Philips Company, Inc., New York, N.Y., a corporation of Delaware
Filed Oct. 14, 1963, Ser. No. 315,803
2 Claims. (Cl. 313—80)

The invention relates to a cathode-ray tube comprising two quadripole electrostatic electron lenses disposed in quadrature. Each lens has a converging action in one plane and a concomitant diverging action in a plane at right angles to the first-mentioned plane, which planes are axial planes, which means planes going through the optical axis of the lens. In this manner there is readily obtained a high degree of convergence with corrected aberrations with a large operative aperture. Consequently these electrostatic lenses may be used to focus an electron beam on a cathode-ray tube. In those cases in which astigmatic focusing the beam is desired this arrangement is very advantageous, since the focusing effect can be controlled independently in two orthogonal planes.

It is known that the ideal field configuration of a quadripole lens has, in a cross-section, an equilateral, rectangular, hyperbolic pattern. An approximation of such a pattern is obtained by means of an electrostatic lens structure comprising two coaxial tubes, an inner tube and an outer tube, the inner tube being provided with two rectangular windows arranged in opposite regions of the tube. When a potential difference is set up between the inner tube and the outer tube, the resulting lens field has a satisfactory configuration in a small region close to the optical axis.

With two electrostatic quadripole lenses disposed in quadrature there is known a structure in which the two lenses have a common, tubular inner electrode in which the two pairs of windows are at right angles to each other and are spaced apart from each other by a given distance, the outer electrode consisting of separate, tubular elements in order to permit of applying different potentials to the separate outer electrode parts, so that the strengths of the two quadripole lenses may be adjusted independently. It is often required that the outer electrodes of these two quadripole lenses be located as closely as possible to each other when the axial separation of the centres of the two quadripole lenses must be little greater than half the sum of their lengths. Due to the small distance between the outer electrodes and the difference between their voltages there is the risk of sparking between the adjacent edges of the two outer tubular elements particularly if, as is desirable in practice, they are cylinders of identical diameters. The invention has for its object to provide an electrostatic quadripole lens structure which is free of this disadvantage.

In accordance with the invention the two quadripole, electrostatic electron lenses consist of a common, tubular, conductive outer electrode and of an inner electrode each, consisting of a pair of conductive plates insulated from the outer electrode and located therein so as to be symmetrically disposed on either side of an axial plane and which plates are divided symmetrically into two equal parts by an axial plane normal to the first-mentioned plane, while the axial distance of one pair of conductive plates from the electron gun exceeds that of the other pair from the electron gun.

In this manner sparking is avoided, while maintaining the facility of separate control for the two lenses. This is mainly for two reasons. Firstly it has been found that gaps between parts at different potentials can be increased as compared with known constructions. Secondly, it permits for example the use of an outer electrode system formed as a conductive coating on glass and held at a high positive voltage in conjunction with grounded lens plates, in which case the field is the wrong way round for the field emission from edges, points of non-uniformities in the coating. Metal parts may be freed of burrs and can be smoothed, which is not possible with coatings e.g. coatings of the material solid under the trademark "Aquadag" or of aluminum.

In the arrangement according to the invention each pair of plates is an inner electrode system which defines, between its longitudinal edges, two gaps which replace the two windows of the corresponding lens of known structure. These gaps permit appropriate field penetration from the outer electrode system. The solid angle subtended by each gap at the optical axis is preferably in the range 95°–105° or in other words each plate of the inner electrode subtends a solid angle at the axis in the range 75°–85°. This contributes to obtaining an approximately hyperbolic field configuration.

The cross-sections of the inner and outer electrode may, for example, have an octagonal or other polygonal form, but these electrodes are preferably cylindrical or circular cross-section and for the sake of simplicity it will be assumed hereinafter that we are concerned with the last-mentioned shape. Particularly, each plate of the inner electrode has two opposite rectilinear edges parallel to the optical axis.

If the cylindrical electrodes have a circular cross-section, more particularly, the inner surfaces of the plates lie on a first cylinder of circular cross-section, while the operative inner surfaces of the outer electrode lie on a second cylinder of circular cross-section coaxial with said first cylinder.

As stated above, the outer electrode system may be formed as a conductive coating on glass. In general, the outer electrode system is constituted by thin, conductive surfaces deposited on the inside of insulating supporting surfaces. The outer electrode system need not be continuous provided that its parts cover the gaps between the plates of each lens. This is meant to say that the outer electrode extends at least over an area having the same axial length and position as the gap between the plates and has a cross-section subtending at the axis the same angle as that subtended by the parallel, longitudinal edges of the plates. These are minimum requirements based on the fact that the main lens field depends upon the inward penetration of the field set up between the two electrodes. Thus it is possible to use an outer electrode system which is subdivided into separate parts. For example, the system may comprise two equal halves divided longitudinally along an axial plane, so as to permit an ancillary potential difference to be applied between the two halves in addition to any main potential difference set up between the inner and outer system; such an ancillary potential difference may be a direct voltage, used for example for beam centering purposes. Similarly, the outer system may be divided into separate electrode areas appertaining to the two lenses, so that the lenses can be separately controlled. However, all these requirements can be met with a single, continuous, tubular electrode surrounding the plates of both lenses provided that each of the four plates has a separate lead. This solution is preferred, one reason being that the plates are nearer the beam, so that the ancillary voltages will be more effective when applied to them. The outer electrode system is particularly constituted by a tube forming part of the anode system of the electron gun.

Where an orthogonal pair of lenses as described is employed to focus the beam of a cathode-ray tube for display purposes, the outer electrode system may be provided as a coating on the inner surface of a glass tube which may be the neck of the tube. This arrangement is particularly advantageous, since the outer electrode system may be formed by the same process as the conductive coating normally provided inside the cone of a cathode-ray tube. More particularly the cone of the envelope has a conductive inner coating which is electrically connected to the outer electrode system. A further advantage of the last-mentioned arrangement lies in the fact that the outer electrode system can thus readily be given a low degree of conductivity as required to reduce eddy currents in cases where deflection coils are used.

As stated above, the resulting lens field has a satisfactory configuration in a small region close to the optical axis, but in the major part of the cross sectional area the aberrations are too severe for precision applications. It is known that an improved configuration can be obtained in the known electrostatic lens structure comprising an inner tube and an outer tube, the inner tube being provided with two rectangular windows, by arranging conductive extensions in the windows substantially parallel to the optional axis and/or by providing auxiliary openings in the parts of the inner electrode between the windows, said extensions and/or auxiliary openings being symmetrical to both of the said planes of symmetry. In the cathode-ray tube according to the invention there may be provided for the relevant correction purposes, slits substantially parallel to the optical axis in the plates, said slits being symmetrical to the two said planes of symmetry. Moreover, for correction purposes, the gaps between the plates may accommodate, substantially parallel to the optical axis, wires or bars lying symmetrically to the two said planes of symmetry. These wires or bars are electrically connected to the inner electrode system. Such a conductive extension may project a relatively short distance into the gap area or it may extend along the full axial length of the plates in a direction parallel to the optical axis. A combination of the two correction methods i.e. conducting extensions and auxiliary openings, has the advantage that the field is corrected to a substantially equal extent in the two planes of symmetry.

If the plates of one electron lens are in quadrature to the plates of the other electron lens, the potential differences of the inner electrode and of the outer electrode of the two lenses should have the same polarity.

If the centres of the plates of one electron lens are longitudinally aligned with the centres of the plates of the other electron lens, it is necessary for the desired lens effect in two orthogonal directions that the potential differences of the inner electrode and of the outer electrode of the two lenses should have different polarities. In the case of a common outer electrode the potential of the plates of one lens is above the potential of the outer electrode, while the plates of the other lens are at a potential below that of the outer electrode.

The cathode-ray tubes described above may have the shape in which periodical focusing of the electron beam is required, for example a travelling-wave tube or a synchrotron. In this case the periodical focusing may be obtained by means of a sequence of pairs of quadripole lenses in quadrature arrangement.

The invention will be described more fully with reference to the drawing, in which.

Figure 1:
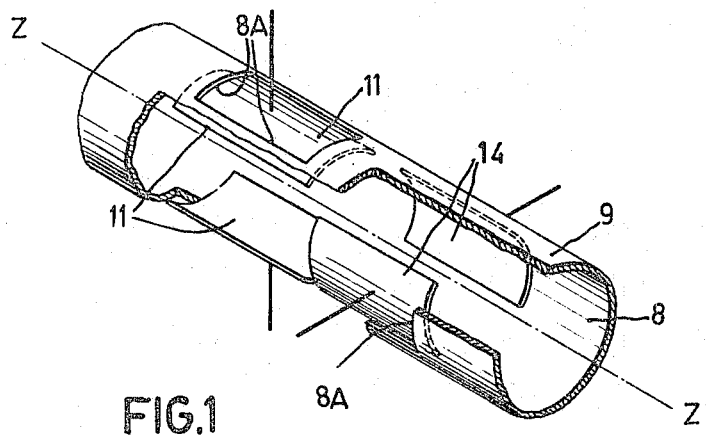
FIG. 1 shows a perspective of the inner electrode system of two quadripole lenses arranged in quadrature.

The cathode-ray tube can be used (subject to variations in the potentials applied) for conventional deflection, but the tube will be described and shown as using a magnetic lens for magnetic deflection.

The cathode-ray tube has a glass neck 1 containing an electron gun comprising a cathode 2, an intensity control-electrode 3, a spark trap 4 and an anode 5. The gun structure 2 to 5 is carried by three ceramic rods 6.

The anode 5 is electrically connected (at 7) to a conductive layer 8, for example of aluminum, provided on the inner cylindrical surface of a glass tube 9, carried within the neck 1. The coating 8 extends from A to B and constitutes a common outer electrode system for both of the electro-static quadripole lenses of the focusing member. The first of the said lenses comprises an inner electrode system constituted by a pair of part-cylindrical plates 11 carried within the tube 9 by supports 12 each mounted in a portion of the glass tube 9, which is clear of conductive coating. The uncovered area is, as shown at 8A in FIG. 2, smaller than the area of the corresponding plate 11, so that the outer electrode 8 covers fully the two gaps, between the plates 11 in the sense defined. One of the mountings 12 of each plate 11 is connected by a lead 13, to an apropriate contact in the base of the tube (not shown) and it is one of the purposes of the tube 9 to permit a separate lead for each of the lens plates to be taken to the tube base, so as to avoid external connections through the wall of the neck 1.

The second quadripole lens comprises two plates 14 mounted in a similar manner to the tube 9 by mountings 15 and connected through separate leads 16.

The cone 22 of the envelope between the neck 1 and the viewing screen (not shown) has a conducting inner coating, which is connected at 23 to the outer electrode 8.

Figure 3:
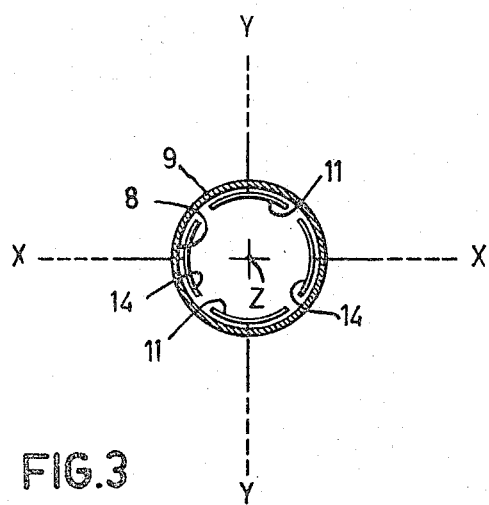
FIG. 3 is a cross-sectional view taken on the line III—III in FIG. 2.

As will be seen from FIG. 3 the angle subtended at the optical axis Z by the parallel, longitudinal edges of each plate 11 or 14 is about 77°, which is within the preferred range of 75° to 85°.

Figure 2:
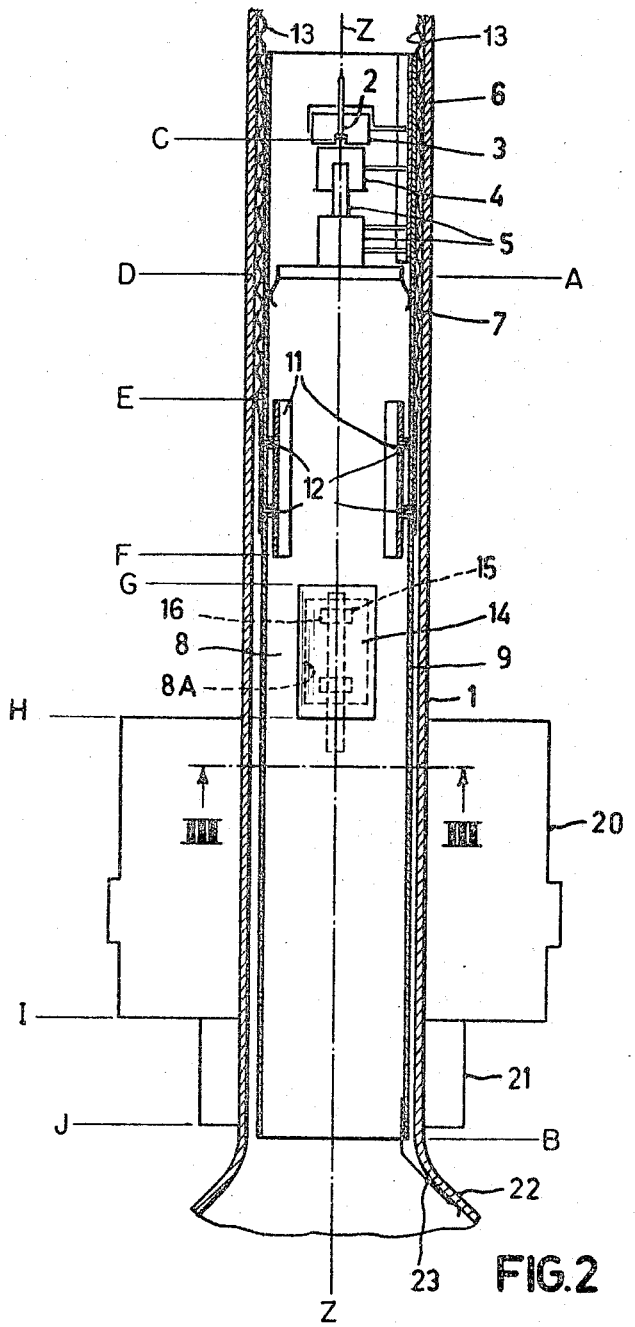
FIG. 2 is a longitudinal sectional view of a cathode-ray tube along one of the two planes of symmetry (indicated here by Y), containing the optical axis Z

FIGS. 2 and 3 are drawn to a common scale and FIG. 2 shows the outlines of the magnetic deflection means 20 and deflection-magnifying lens 21. The actual dimensions may be as given below:

*Table I*

| | Mms. |
|---|---|
| C–D | 25 |
| C–E | 47.5 |
| C–F | 77.5 |
| C–G | 82.5 |
| C–H | 107.5 |
| C–I | 164.5 |
| I–J | 20 |
| Inner diameter of tube 9 | 27 |
| Inner diameter of plates 11, 14 | 23 |

With the dimensions such as those given in Table I the voltages applied to the gun and the lens electrodes may be as follows:

*Table II*

| | | |
|---|---|---|
| Electrode 8 and viewing screen | kv | 18 |
| Plates 11 | kv | 2 |
| Plates 14 | kv | 2 |
| Spark trap 4 | v | 0 |
| Grid 3 | | −120 v. to −40 v. |
| Cathode 2 | v | 0 |

Excessive potential differences in the base of the tube are avoided by applying the 18 kv. voltage to the layer 8 via 23 and the conductive layer of the cone from an external connection through the wall of the latter (not shown).

The plain plates of the present example provide sufficiently accurate focusing for most applications. If greater accuracy is required a symmetrical pair of longitudinal, correcting slits may be provided in each plate of one (or, possibly, each) lens; alternately, or in addition, a symmetrical pair of longitudinal, correcting bars or wires may be provided in each gap between the respective plates. Such bars or wires would be at the same potential as the respective plates and may, for example, be supported by lugs projecting from the corners of the said plates.

With voltages as given in Table II the conditions are favorable for avoiding the risk of sparking due to breakdown of the layer 8 by the action of field emission. As aforesaid, the polarity of the voltages applied between the inner and the outer electrodes of the lens may be reversed, in which case the direction of the lens action is turned through 90°. (However, if this is done for both lenses in the present example, the aforesaid favorable conditions for immunity from sparking are lost.) This principle can also be applied to only one of the two lenses and this leads to a first modification of the invention whereby one of the two quadripole lenses has its plates turned through 90°, so that the plates of the two lenses have their centres aligned instead of being in quadrature. If this is done with a common outer electrode then the lens fields are kept in quadrature by ensuring that the potential of the plates of one lens is above the potential of the outer electrode, while the plates of the other lens are at a potential below that of the outer electrode. This will entail higher potential differences, so that it may be necessary to connect the plates through the neck wall instead of through the tube base.

Hitherto the focusing systems described have employed one pair of quadripoles physically, or at least electrically, in quadrature in a cathode-ray tube. As a second modification of the invention it is possible to use a series of quadratured pairs of quadripole lenses in a vacuum device of the kind requiring periodical focusing of an electron beam, for example a travelling wave tube or a synchrotron. The lenses of each pair may be physically in quadrature, in which case potential differences of the same polarity must be applied to all lenses. Alternatively, the plates of all lenses of all the pairs may have their centres aligned longitudinally in which case any two adjacent lenses must have applied potential differences of opposite polarities so that they are electrically in quadrature.

What is claimed is:

1. A cathode-ray tube including an electron gun and beam focusing means having a common optical axis, said focusing means being constituted by a quadripole electrostatic electron lens structure comprising a tubular conductive outer electrode system, a first pair of conductive plates having inwardly concave cross-sections and insulated from the outer system and located therein so as to be symmetrically disposed on either side of a first axial plane while being symmetrically intersected by a second axial plane normal to said first plane, and a second pair of conductive plates also having inwardly concave cross-sections and insulated from the outer system and located therein so as to be symmetrical with respect to the same two axial planes but in quadrature with respect to the first pair and spaced therefrom in the axial direction so as to be farther from the gun.

2. A cathode-ray tube including an electron gun, means for deflecting a beam produced by said gun, and beam focusing means located between said gun and the effective center of said deflection means on a common optical axis, said focusing means being constituted by a quadripole electrostatic electron lens structure comprising a tubular conductive outer electrode system, a first pair of conductive plates having inwardly concave cross-sections and insulated from the outer system and located therein so as to be symmetrically disposed on either side of a first axial plane while being symmetricaly intersected by a second axial plane normal to said first plane, and a second pair of conductive plates also having inwardly concave cross-sections and insulated from the outer system and located therein so as to be symmetrical with respect to the same two axial planes but in quadrature with respect to the first pair and spaced therefrom in the axial direction so as to be farther from the gun.

References Cited by the Examiner
UNITED STATES PATENTS

| | | | |
|---|---|---|---|
| 2,139,829 | 12/1938 | Knoll | 313—80 |
| 2,409,222 | 10/1946 | Morton | 313—80 |
| 2,834,908 | 5/1958 | Kompfner | 315—3.6 |

JAMES W. LAWRENCE, *Primary Examiner.*

V. LAFRANCHI, *Assistant Examiner.*